(12) United States Patent
Araki

(10) Patent No.: US 11,095,235 B2
(45) Date of Patent: Aug. 17, 2021

(54) VIBRATION TYPE ACTUATOR FOR RELATIVELY MOVING VIBRATING BODY AND CONTACT BODY, ELECTRONIC DEVICE, AND METHOD FOR INSPECTING FRICTION MATERIAL

(71) Applicant: CANON KABUSHIKI KAISHA, Tokyo (JP)

(72) Inventor: Yasuyuki Araki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 16/377,394

(22) Filed: Apr. 8, 2019

(65) Prior Publication Data

US 2019/0319552 A1    Oct. 17, 2019

(30) Foreign Application Priority Data

Apr. 11, 2018   (JP) .............................. JP2018-076278

(51) Int. Cl.
*H02N 2/00*      (2006.01)
*H02N 2/02*      (2006.01)

(52) U.S. Cl.
CPC ............. *H02N 2/001* (2013.01); *H02N 2/007* (2013.01); *H02N 2/026* (2013.01)

(58) Field of Classification Search
CPC ........ H02N 2/001; H02N 2/026; H02N 2/007; H02N 2/103; H02N 2/0015; H02N 2/12
See application file for complete search history.

(56) References Cited

U.S. PATENT DOCUMENTS

2013/0221805 A1* 8/2013 Ogura .................... G10K 11/02
                                                              310/334
2017/0359002 A1   12/2017 Morita et al.

FOREIGN PATENT DOCUMENTS

JP          2017-225333 A     12/2017

* cited by examiner

*Primary Examiner* — Emily P Pham
(74) *Attorney, Agent, or Firm* — Venable LLP

(57) ABSTRACT

A vibration type actuator uses a friction material of which a depth of impregnation with a resin can be easily measured in a non-destructive manner. The vibration type actuator has a vibrating body including an electro-mechanical energy conversion element and an elastic body; and a contact body configured to come into contact with the vibrating body. The vibration type actuator has a structure in which at least one of a friction portion of the contact body coming into contact with the vibrating body and a friction portion of the vibrating body coming into contact with the contact body has a metallic portion including a pore that is impregnated with a resin containing a fluorescent material.

9 Claims, 8 Drawing Sheets

MODE A

MODE B

VIBRATION TYPE ACTUATOR FOR RELATIVELY MOVING VIBRATING BODY AND CONTACT BODY, ELECTRONIC DEVICE, AND METHOD FOR INSPECTING FRICTION MATERIAL

BACKGROUND OF THE INVENTION

Field of the Invention

The present invention relates to a vibration type actuator for relatively moving a vibrating body and a contact body, an electronic device, and a method for inspecting a friction material.

Description of the Related Art

There has been known a vibration type actuator for relatively moving a vibrating body and a contact body (driven body) by bringing the vibrating body including an electro-mechanical energy conversion element into contact with the contact body and frictionally driving the contact body through predetermined vibration excited in the vibrating body. Such a vibration type actuator uses a frictional force between the vibrating body and the contact body and thus has a feature of realizing a large holding torque or holding force. This makes it possible, even when receiving an external force, to maintain a positional relationship between the vibrating body and the contact body without requiring a particular mechanism or energy (applying an electric current) for maintaining the positional relationship between the vibrating body and the contact body.

However, it is generally considered that a holding force tends to be decreased when the vibration type actuator is subjected to a high-humidity environment or the vibration type actuator lies idle for a long time. Therefore, Japanese Laid-Open Patent Publication (Kokai) No. 2017-225333 suggests a technology of using a sintered stainless steel body impregnated with a resin, as a friction material of a contact body in order to improve a holding force between a vibrating body and the contact body.

In the friction material described in Japanese Laid-Open Patent Publication (Kokai) No. 2017-225333, not all the pores in a frictional sliding face are filled with the resin. This is because the sintered stainless steel body includes a closed pore which is not impregnated with the resin, so that the pore which is not impregnated with the resin is exposed to a surface by a polishing processing performed after a resin impregnation processing, or the resin is separated from the pore by the polishing processing.

Meanwhile, a pore (empty pore) in the frictional sliding face of the sintered stainless steel body needs to be impregnated with a predetermined amount of resin or more in order to maintain the holding force. Therefore, inspection of whether or not the pore in the frictional sliding face is impregnated with the predetermined amount of resin or more needs to be performed in order to secure performance of the vibration type actuator. In general, however, the pore is small and the resin has transparency, thereby making it difficult to distinguish between a pore which is impregnated with the resin and a pore which is not impregnated with the resin even through observation using a metallographic microscope or the like.

Further, in the processing of impregnating the sintered stainless steel body with the resin, an operation of increasing a processing temperature to decrease viscosity, or the like is performed, thereby easily impregnating the pore with the resin. However, there is no unit for measuring a depth of impregnation with the resin in a non-destructive manner, and the depth of impregnation has been, heretofore, measured by extracting a sample for inspection from the sintered stainless steel body after the impregnation processing, cutting the sample, and observing a cross section of the sample. However, a total inspection cannot be performed in a production process by the method described above and thus a unit for measuring the depth of impregnation in a non-destructive manner has been demanded.

SUMMARY OF THE INVENTION

The present invention provides a vibration type actuator using a friction material of which a depth of impregnation with a resin can be easily measured in a non-destructive manner.

Accordingly, the present invention provides a vibration type actuator comprising: a vibrating body including an electro-mechanical energy conversion element and an elastic body; and a contact body configured to come into contact with the vibrating body, wherein the vibration type actuator has a structure in which at least one of a friction portion of the contact body coming into contact with the vibrating body and a friction portion of the vibrating body coming into contact with the contact body has a metallic portion including a pore that is impregnated with a resin containing a fluorescent material.

According to the present invention, it is possible to easily measure a depth of impregnation with the resin of the friction material used in the vibration type actuator, in a non-destructive manner.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
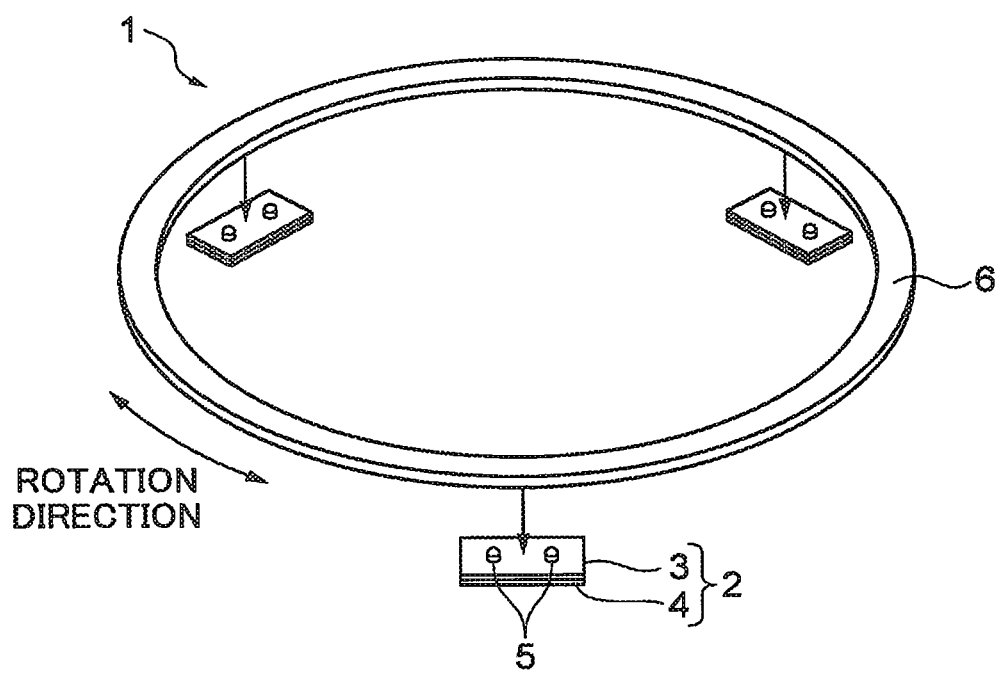
FIG. 1 is a view showing a schematic structure of a vibration type actuator according to the present invention.

FIG. 1 is a view which is useful in explaining a schematic structure of a vibration type actuator 1. The vibration type actuator 1 includes a vibrating body 2 and a ring-shaped contact body 6 which is a driven body frictionally driven by the vibrating body 2.

The vibrating body 2 includes a flat-plate-shaped elastic body 3, a piezoelectric element 4 which is an electromechanical energy conversion element adhering to one face of the elastic body 3, and two protrusions 5 disposed on the other face of the elastic body 3. As the elastic body 3, for example, a thin stainless plate can be used. The protrusions 5 may be formed integrally with the elastic body 3 by press working of the elastic body 3, or the like, or may be bonded to the elastic body 3 by using a bonding method such as welding or adhesion.

Figure 2A:
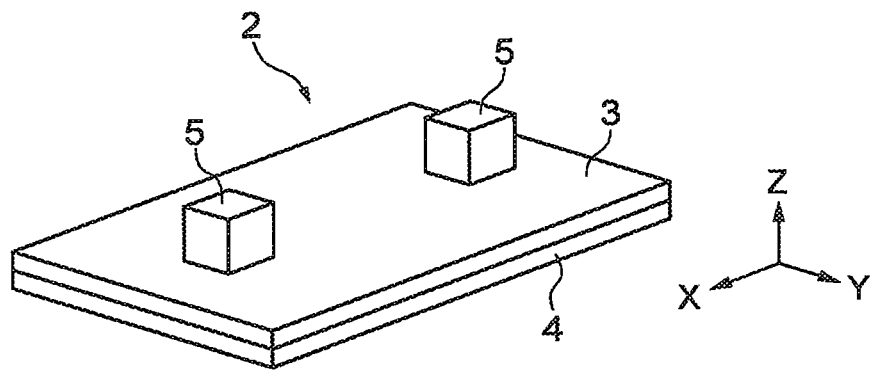
FIGS. 2A to 2C are schematic views for describing vibration excited in a vibrating body.

FIG. 2A is a perspective view schematically showing the vibrating body 2. The piezoelectric element 4 is so constructed, for example, that a common electrode (full-surface electrode) (not shown) is formed on one face thereof on a side of the elastic body 3 and a driving electrode (not shown) bisected in a length direction is formed on the other face of the elastic body 3.

Figure 2B:
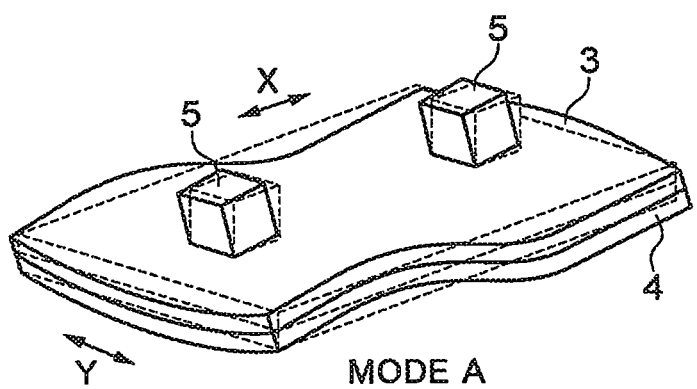

FIG. 2B is a view which is useful in explaining a first vibration mode (hereinafter, referred to as the "mode A") of two flexural vibration modes with respect to vibration excited in the vibrating body 2. The mode A is a second-order flexural vibration in a longitudinal direction (X direction) of the vibrating body 2 and has three nodal lines which are approximately in parallel to a transverse direction (Y direction (width direction)) of the vibrating body 2. The vibration of the mode A can be excited in the vibrating body 2 by applying an alternating voltage with a phase shifted by 180° at a predetermined frequency to the driving electrode of the piezoelectric element 4. Each of the protrusions 5 is disposed in the vicinity of a position corresponding to a node of the vibration of the mode A, and excitation of the vibration of the mode A in the vibrating body 2 causes the protrusions 5 to reciprocate in the X direction.

Figure 2C:
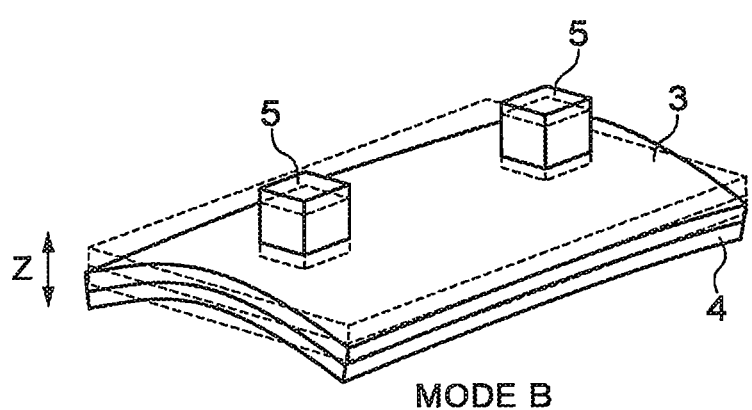

FIG. 2C is a view which is useful in explaining a second vibration mode (hereinafter, referred to as the "mode B") of the two flexural vibration modes with respect to vibration excited in the vibrating body 2. The mode B is a first-order flexural vibration in a transverse direction (Y direction) of the vibrating body 2 and has two nodal lines which are approximately in parallel to the longitudinal direction (X direction) of the vibrating body 2. The vibration of the mode B can be excited in the vibrating body 2 by applying an alternating voltage with the same phase at a predetermined frequency to the driving electrode of the piezoelectric element 4. Each of the protrusion 5 is disposed in the vicinity of a position corresponding to an antinode of the vibration of the mode B, and excitation of the vibration of the mode B in the vibrating body 2 causes the protrusions 5 to reciprocate in an axial direction of the protrusion 5 (Z direction).

The vibrating body 2 is so constructed that a nodal line in the mode A and a nodal line in the mode B are approximately orthogonal to each other in an X-Y plane. In addition, a flexible substrate (not shown) is adhered to the piezoelectric element 4, and an alternating current is supplied to the piezoelectric element 4 through the flexible substrate, which makes it possible to excite the vibration of the mode A and the vibration of the mode B in the vibrating body 2 at the same time. Therefore, exciting the vibration of the mode A and the vibration of the mode B with a predetermined phase difference makes it possible to generate an elliptic movement of a tip end of the protrusion 5 in a Z-X plane.

In the vibration type actuator 1, each of three vibrating bodies 2 is disposed such that a straight line connecting the two protrusions 5 becomes a tangent line of the ring-shaped contact body 6, and comes in contact with the contact body 6. As a result, when the contact body 6 is supported rotatably in a rotation direction indicated by an arrow shown in FIG. 1 and the vibration of the mode A and the vibration of the mode B are excited in the vibrating body 2 at the same time, the contact body 6 is frictionally driven by the protrusions 5 and rotates in a circumferential direction thereof. It should be noted that a support member which rotatably supports the contact body 6, a holding member which holds the vibrating body 2, a pressing unit for bringing the vibrating body 2 into contact with the contact body 6, and the like are omitted in FIG. 1. In this embodiment, the vibrating body 2 is fixed and the contact body 6 is rotatable is described, but the contact body 6 may be fixed and the three vibrating bodies 2 may rotate together with the holding member.

Figure 3A:
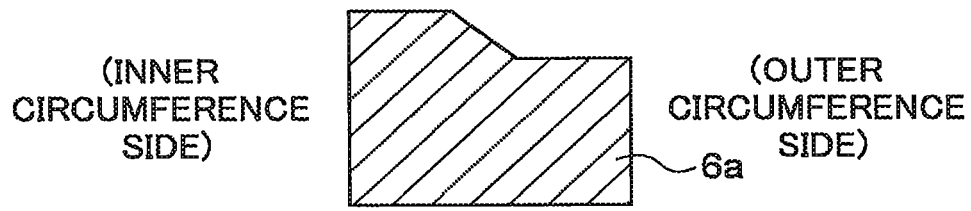
FIGS. 3A to 3C are views each showing a radial direction-cross section of a contact body to describe a structure of the contact body and a method for producing the contact body.
Figure 3B:
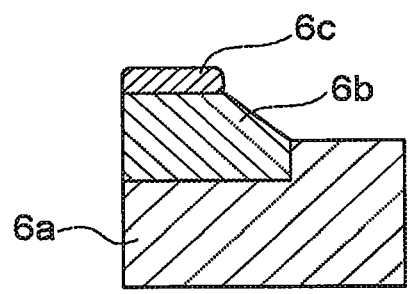
Figure 3C:
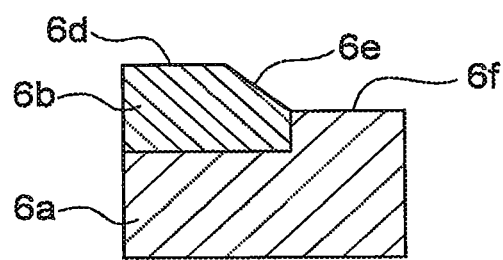

FIGS. 3A to 3C are radial direction-cross sectional views of the contact body 6 which are useful in explaining a structure of the contact body 6 and a method for producing the contact body 6, in which the left side is directed to an inner circumference of the contact body 6 and the right side is directed to an outer circumference of the contact body 6. According to the present embodiment, a sintered body 6a (FIG. 3A) is used for the contact body 6, the sintered body 6a being formed of a martensitic stainless steel corresponding to SUS420J2. A raw material powder in which SUS410L powder with an excellent flowability and carbon powder are mixed is used for the sintered body 6a. It is preferable that a content of carbon is within a range from 0.3 to 0.9 wt % in consideration of a rust resistance or a mechanical strength. In this embodiment, a content of carbon is 0.5 wt %. In addition, non-spherical powder having a particle size distribution in which a particle size is equal to or less than about 150 μm and an average particle size is about 75 μm is used as the SUS410L powder.

The sintered body 6a is produced by a processing (sintering process) of binding powder particles to one another by maintaining a predetermined temperature of a molded body of the raw material powder equal to or less than a melting point. In this embodiment, it is necessary to secure pores (empty pores) in which an epoxy resin containing a fluorescent material is to be impregnated as will be described later. Therefore, a production condition of the sintered body 6a is adjusted such that a density of the obtained sintered body 6a is about 6.2 to 6.7 g/cm$^3$, a size of each of the pores is about several microns to 100 μm, and a porosity of a frictional sliding face 6d (see FIG. 3C) is about 5 to 20%.

In order to improve a wear resistance of the frictional sliding face when the sintered body 6a is used as the contact body 6, a vickers hardness of the sintered body 6a is set to be equal to or more than 550HV0.2. As a method for improving a hardness, a method of quenching the sintered body 6a is known. However, in this embodiment, quenching is substantially performed in the sintering process by adjusting a cooling condition of sintering without separately performing a quenching process, thereby making the sintered body 6a correspond to SUS420J2. A method of quenching only a frictional sliding portion by laser or the like may be used as a method for improving a hardness of the frictional sliding portion of the contact body 6. In this case, since only a part of the sintered body is quenched, deformation of the sintered body may be suppressed. Further, in a case where only the frictional sliding portion is quenched, when an inner diameter or an outer diameter of the sintered body is adjusted by a cutting processing in order to improve dimension precision, a target portion of the cutting processing is not quenched and thus a hardness thereof is not increased, which makes the processing easy. An austenitic stainless steel SUS316 may be used for the sintered body 6a, instead of the SUS420J2, together with a material which is provided with a nitride layer having a high hardness due to ion nitriding to thereby have an improved wear resistance.

Next, the sintered body 6a is impregnated with a liquid epoxy resin containing a fluorescent material. It should be noted that the "epoxy resin" in the following description indicates the "epoxy resin containing the fluorescent material" unless indicated otherwise. In this embodiment, the fluorescent material indicates a material having a property of transitioning from a ground state to an excited state by absorbing light (excited light) with a certain wavelength and releasing energy as light (fluorescence) when returning from the excited state to the ground state. Examples of the fluorescent material can include a fluorescent dye, a fluorescent pigment, and the like. In this embodiment, a fluorescent dye "C.I. solvent yellow (o-aminoazotoluene)" is used, but a usable fluorescent material is not limited thereto.

As shown in FIG. 3B, an epoxy resin 6c is applied on a surface (upper plane) on an inner circumference side of the sintered body 6a by using a dispenser and the sintered body 6a is left at 80° C. by using an oven or the like to decrease viscosity of the epoxy resin 6c, thereby promoting impregnation of the epoxy resin 6c in the pores of the sintered body 6a. It should be noted that the sintered body 6a is shaped such that an inner circumference thereof is thicker than an outer circumference thereof and that the upper face on the inner circumference side constitutes the frictional sliding face 6d abutting against the vibrating body 2. As a result, the epoxy resin 6c impregnates a region at a predetermined distance (depth) from a surface of the sintered body 6a. The region impregnated with the epoxy resin 6c is defined as a resin impregnating portion 6b. The resin impregnating portion 6b is a portion (friction portion) forming the frictional sliding face 6d of the contact body 6.

After the sintered body 6a is impregnated with the epoxy resin 6c, the sintered body 6a is left at 80° C. for a predetermined time, thereby hardening the epoxy resin. FIG. 3C schematically shows a region of the resin impregnating portion 6b. In practice, however, a boundary between the resin impregnating portion 6b and a region which is not impregnated with the epoxy resin in the sintered body 6a is unclear, as opposed to that shown in FIG. 3C.

When the viscosity of the epoxy resin 6c is decreased by heating the epoxy resin 6c applied on the sintered body 6a, the epoxy resin 6c further spreads in the radial direction than when being applied, such that the pores of the sintered body 6a are easily impregnated with the epoxy resin 6c. At this time, in a case where an amount of applied epoxy resin 6c is excessively small, even when the whole applied epoxy resin is impregnated, the epoxy resin may not be impregnated up to a desired depth and hence the resin impregnating portion 6b may not be generated up to a required depth. In order to prevent such a problem described above, the amount of applied epoxy resin is adjusted such that a predetermined amount of epoxy resin remains on the sintered body 6a after a hardening processing. At this time, it is preferable to consider a change with time in viscosity of the epoxy resin 6c, an erratic amount of applied epoxy resin, temperature control performance of a heating processing apparatus, an erratic porosity of the sintered body 6a, and the like.

The epoxy resin which is hardened on the surface of the sintered body 6a without impregnating the sintered body 6a is removed by using an emery paper formed of green carbon (GC) #320 to expose the resin impregnating portion 6b (frictional sliding face). It should be noted that a method for removing the epoxy resin which is hardened on the surface of the sintered body 6a is not limited, and may be performed by using a diamond grindstone, a GC grindstone, a free abrasive grain, or the like.

Next, a surface of the resin impregnating portion 6b is ground (polished) for smoothing so that the frictional sliding face 6d shown in FIG. 3C is formed by the resin impregnating portion 6b. A known grinding apparatus can be used for the grinding. In this embodiment, the grinding is performed by pressing the surface of the resin impregnating portion 6b against a copper surface plate on which a polycrystalline diamond (3 μm) is applied while rotating the copper surface plate. It should be noted that a rust prevention processing is performed by washing the resin impregnating portion 6b with sodium bicarbonate water or the like (alkaline washing) in the intervals of the grinding or after the grinding is completed. By doing so, a friction material in which the frictional sliding face 6d is formed by the resin impregnating portion 6b is obtained. In this embodiment, the thus produced friction material is used as the contact body 6.

Here, a shape of the contact body 6 will be described. As shown in FIG. 3C, an inner diameter of the frictional sliding face 6d approximately coincides with the inner diameter of the sintered body 6a. However, an outer diameter of the frictional sliding face 6d is less than the outer diameter of the sintered body 6a. That is, a width of the frictional sliding face 6d in the radial direction is less than a width of the sintered body 6a in the radial direction. This is to reduce a load required for a processing of removing the unnecessary epoxy resin after the impregnation processing with the epoxy resin 6c or the grinding processing. The width of the frictional sliding face 6d in the radial direction can be set in consideration of a dimensional tolerance or an assembly error, so as to secure a region for frictional sliding with the protrusion 5 of the vibrating body 2. In this embodiment, the frictional sliding face 6d is disposed on the inner circumference side of the sintered body 6a, and the vibrating body 2 is disposed on a center side of the vibration type actuator 1, thereby promoting space-saving. However, the present invention is not limited thereto, and the frictional sliding face 6d can also be disposed on the outer circumference side or the center side of the sintered body 6a.

The contact body 6 has an inclined face 6e formed so as to be inclined from one end of the frictional sliding face 6d on the outer circumference side thereof toward the outer circumference thereof such that the inner circumference thereof is thicker than the outer circumference thereof. The inclined face 6e has a gradient angle of less than 90 degrees with respect to the frictional sliding face 6d, for example, a gradient angle within a range from 30 to 60°. In this embodiment, a region from one end of the inclined face 6e on the outer circumference side of the contact body 6 to the outer circumference of the contact body 6 corresponds to a flat face 6f formed to be approximately in parallel to the frictional sliding face 6d. However, the present invention is not limited thereto, and the flat face 6f may also be formed to be an inclined face (collecting plane) with a gradient reverse to that of the inclined plane 6e.

Next, a result of confirming a depth of impregnation with the epoxy resin, that is, a depth of the resin impregnating portion 6b from the frictional sliding face 6d will be described. As described above with reference to FIGS. 3A to 3C, it is necessary that the sintered body 6a is impregnated with the epoxy resin to a predetermined depth, such that the frictional sliding face 6d is formed by grinding the resin impregnating portion 6b.

Figure 4A:
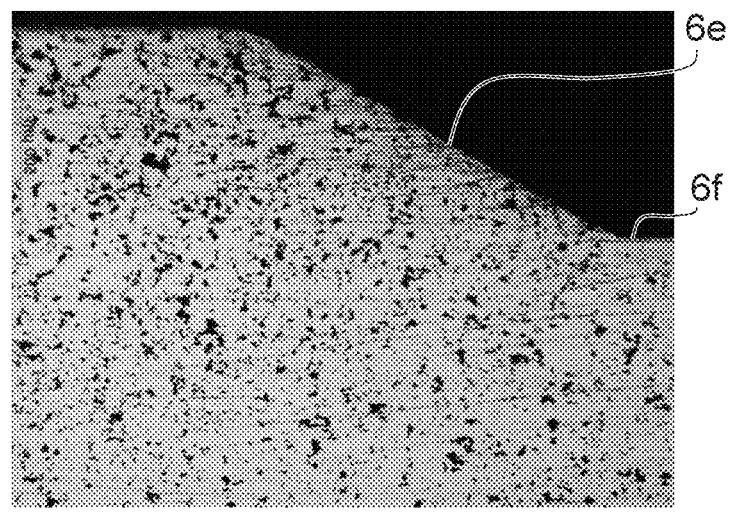
FIGS. 4A and 4B are pictures obtained by shooting a portion of a cross section of a sintered body after a processing of hardening an epoxy resin.
Figure 4B:
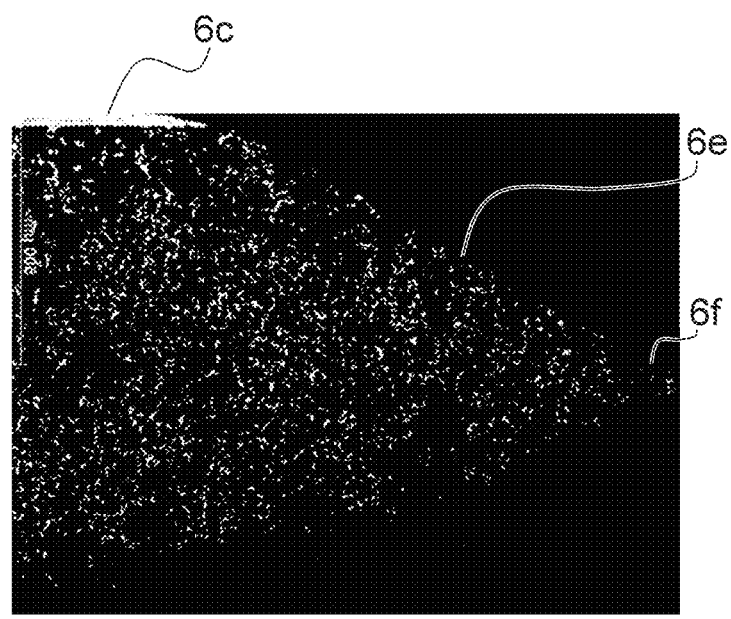

FIGS. 4A and 4B are pictures obtained by shooting a portion of a radial direction-cross section of the sintered body 6a after the processing of hardening the epoxy resin. Here, a common lens is used for a metallographic microscope and a fluorescence microscope with a light source and a filter changed, to thereby shoot a picture of the same position. FIG. 4A is a picture shot by the metallographic microscope and FIG. 4B is a picture obtained by shooting the same position as that of FIG. 4A by the fluorescence microscope and subjected to gray-scaling. A general metallographic microscope uses a tungsten lamp, a halogen lamp, or the like as a light source to perform observation. Meanwhile, the fluorescence microscope uses, to perform observation, an ultra-high pressure mercury lamp capable of irradiating light corresponding to an excitation wavelength of a fluorescent material, a xenon lamp, an ultraviolet light emitting diode (LED), laser light, or the like as a light source. Due to such a difference, a metallic portion of the sintered body 6a is shown as white and a pore is shown as black in observation using the metallographic microscope, and a fluorescent material contained in a resin in the pore is shown as a fluorescent color corresponding to the fluorescent material in observation using the fluorescence microscope. In this embodiment, the fluorescent color is yellowish green.

As shown in FIG. 4B, the epoxy resin 6c which remains without impregnating the sintered body 6a is confirmed, but attachment of the epoxy resin on the inclined face 6e is not observed. Meanwhile, it is appreciated that the applied epoxy resin 6c permeates even in the radial direction, in addition to a depth direction along the pore of the sintered body 6a, and reaches the inclined face 6e. Therefore, the sintered body 6a has a number of pores extending from the upper face thereof to a side face thereof. As a result, it can be considered that the epoxy resin impregnating the sintered body 6a from the upper face of the sintered body 6a permeates to the vicinity of a surface of the pore in the side face. As described above, it is possible to confirm the epoxy resin impregnating an inner portion of the sintered body 6a by the observation using the fluorescence microscope.

The depth of impregnation with the epoxy resin can be measured by the observation using the fluorescence microscope and the epoxy resin permeates the sintered body 6a even in the radial direction in addition to the depth direction of the sintered body 6a and reaches the inclined face 6e, which enables confirmation of the depth of the resin impregnating portion 6b in a non-destructive manner. That is, it is possible to measure the depth of impregnation in a non-destructive manner based on a fact that the epoxy resin impregnating the pore of the sintered body 6a fluoresces a fluorescent color (yellowish green) when an ultraviolet ray or the like is irradiated on the inclined face 6e from a side (outside) of the inclined face 6e. Hereinafter, a method for inspecting the contact body 6 will be described in detail.

Figure 5A:
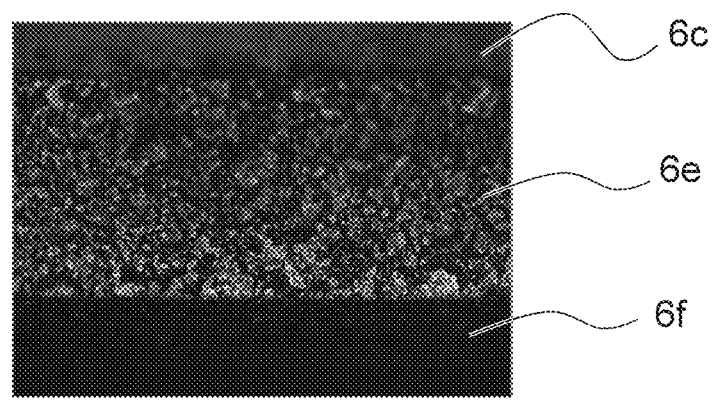
FIGS. 5A and 5B are pictures obtained by shooting a part of a surface of an inclined face of the sintered body after the processing of hardening the epoxy resin.

FIG. 5A is a picture shot from the outside by using the metallographic microscope while focusing on the inclined face 6e. The inclined face 6e is not subjected to sizing or a cutting processing after sintering and thus has pores. The sizing is a processing of putting the sintered body into a mold again and applying a pressure to improve dimension precision. The side face (surface) of the sintered body is rubbed against the mold when the sizing is performed, such that a plastic flow is generated and the pore is thus easily clogged. In addition, also in the cutting processing, the plastic flow is generated on the surface, such that the pore is easily deformed. In this embodiment, the sizing, the cutting processing, or the like is not performed, thereby maintaining the pore in the inclined face 6e.

Figure 5B:
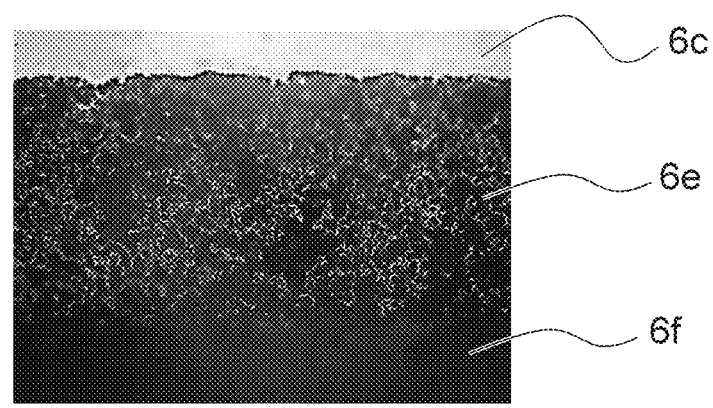

FIG. 5B is a picture obtained by shooting the same position as that of FIG. 5A by the fluorescence microscope and subjected to gray-scaling. It is appreciated that the depth of impregnation with the epoxy resin can be confirmed based on the fact that the epoxy resin impregnating a pore portion is shown as a fluorescent color (yellowish green) in observation of the inclined plane 6e using the fluorescence microscope. Therefore, the contact body 6 inspected in a non-destructive manner can be used as the contact body 6 as it is in the vibration type actuator 1. It should be noted that the epoxy resin 6c reaches the flat face 6f (or the collecting plane) in some cases, and in this case, the depth of the impregnation with the epoxy resin may be confirmed by observing the flat face 6f by the fluorescence microscope.

Figure 6A:
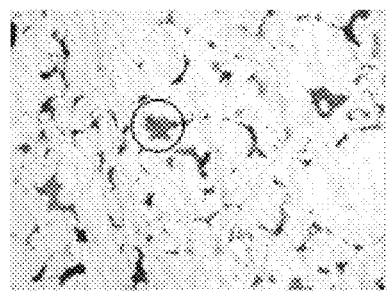
FIGS. 6A and 6B are pictures obtained by shooting a frictional sliding face of the contact body.
Figure 6B:
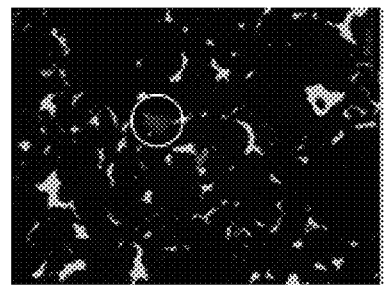

FIG. 6A is a picture obtained by shooting the frictional sliding face 6d of the contact body 6 by the metallographic microscope, and FIG. 6B is a picture obtained by shooting the same position as that of FIG. 6A by the fluorescence microscope. It should be noted that a shooting magnification of both of the metallographic microscope and the fluorescence microscope is 200 times. In observation shown in FIG. 6A, a stainless steel is shown as white and a pore is shown as black. There are a pore which is impregnated with the epoxy resin and a pore which is not impregnated with the epoxy resin. For example, whether or not a pore in a circle shown in FIG. 6A is impregnated with the resin can be easily determined based on the picture of FIG. 6A. Meanwhile, in observation of the same position shown in FIG. 6B, a portion in a circle corresponding to the circle shown in FIG. 6A is not shown as the fluorescent color (yellowish green), which means that the pore in the circles shown in FIGS. 6A and 6B is not filled with the epoxy resin.

A porosity (surface porosity) of the frictional sliding face 6d can be obtained by binarizing the observation picture obtained by using the metallographic microscope. In addition, a rate (resin impregnation rate) of impregnation of the pore in the frictional sliding face 6d with the epoxy resin can be obtained by binarizing a region indicating the pore in the observation picture obtained by using the fluorescence microscope. In addition, a resin filling rate (a value indicating to what degree the pore is filled with the resin) can be confirmed based on the surface porosity and the resin impregnation rate.

As described above, according to this embodiment, it is possible to easily confirm a state of impregnation with the epoxy resin by the observation using the fluorescence microscope. In addition, it is possible to confirm the state of impregnation with the epoxy resin in more detail by combining an observation result obtained using the metallographic microscope with that obtained using the fluorescence microscope.

Figure 7A:
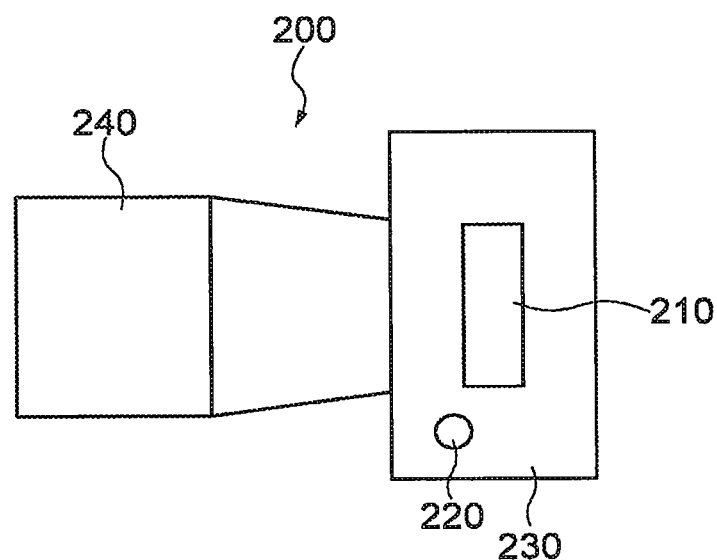
FIGS. 7A and 7B are views for describing a configuration of an image pickup apparatus including the vibration type actuator.

Next, an image pickup apparatus and an industrial robot will be described as an example of an electronic device using the vibration type actuator 1. FIG. 7A is a top view showing a schematic configuration of an image pickup apparatus 200. The image pickup apparatus 200 includes a camera body 230 in which an image pickup device 210 and a power supply button 220 are mounted. Further, the image pickup apparatus 200 includes a lens barrel 240 including a lens group (not shown) and a vibration type actuator. Driving of the lens group is performed by the vibration type actuator. The lens barrel 240 is detachable from the camera body 230 as an interchangeable lens, and a lens barrel 240 suitable for a target for shooting can be attached to the camera body 230. The vibration type actuator 1 described above with reference to FIG. 1 can be used as the vibration type actuator.

Driving of the lens by the vibration type actuator is considered to be suitable for driving of an auto-focus lens, but is not limited thereto. Driving of a zoom lens by the same configuration is also possible. In addition, the vibration type actuator can also be used for driving of a lens for image stabilization or the image pickup device.

Figure 7B:
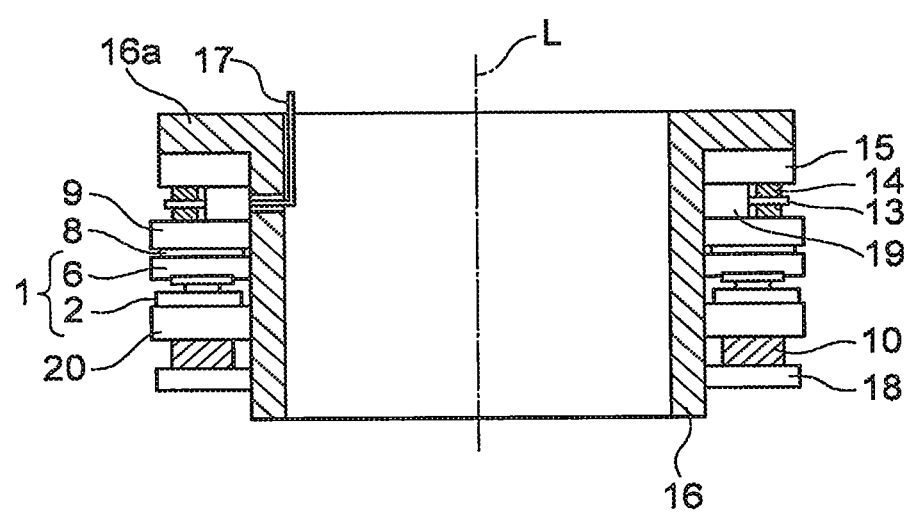

FIG. 7B is a cross-sectional view of the lens barrel in which the vibration type actuator 1 is mounted. The contact body 6 comes into contact with the protrusion of the vibrating body 2 in a direction of an optical axis L. A rotor rubber (anti-vibration rubber) 8 is installed on a face of the contact body 6 opposite to a face coming into contact with the vibrating body 2 and an output transmitting member 9 is installed so as to come into contact with the rotor rubber 8. The vibrating body 2 is held by a holding base 20 such that vibration excited in the vibrating body 2 is not disturbed, and the holding base 20 is pressed toward the contact body 6 by a plate spring 10. The plate spring 10 is pinched between a pressing ring 18 controlling a bending amount of the plate spring 10 and the holding base 20 in order to generate a force of compressing the plate spring 10 to press the holding base 20 toward the contact body 6.

A flange 16a projecting in a direction orthogonal to the optical axis L is disposed in a barrel body 16. A manual ring 15 which is rotatable around the optical axis L is disposed on a face of the flange 16a on a side of the vibration type actuator 1 of the flange 16a, in order to perform manual focusing. A roller ring 19 which is rotatable by transmission of a force from the manual ring 15 or the vibration type actuator 1 is disposed between the manual ring 15 and the vibration type actuator 1. A plurality of roller shafts 13 extending in the radial direction is disposed on the roller ring 19, and a roller 14 is attached to the roller shaft 13 so as to be rotatable around the roller shaft 13. The roller 14 comes into contact with the output transmitting member 9 and the manual ring 15. In addition, an output key 17 is attached to the roller ring 19. The output key 17 is engaged with a cam ring (not shown) which holds the auto-focus lens (not shown), or the like. The pressing ring 18 is engaged with the barrel body 16 at an inner circumference thereof by a screw or a bayonet structure. A position of the pressing ring 18 in the direction of the optical axis L is adjusted to compress the plate spring 10 to pinch the members between the holding base 20 and the manual ring 15 at a predetermined compression force.

When an elliptic movement is excited in the protrusion of the vibrating body 2, the contact body 6 coming into contact with the protrusion is frictionally driven to be rotated. When the contact body 6 is rotated, the rotor rubber 8 coming into contact with the contact body 6 and the output transmitting member 9 coming into contact with the rotor rubber 8 are rotated around the optical axis L together with the contact body 6. Then, the roller 14 coming into contact with the output transmitting member 9 is rotated around the optical axis L together with the roller ring 19 while rolling on the manual ring 15, and the output key 17 installed on the roller ring 19 rotates the cam ring (not shown) or the like. As a result, the auto-focus lens held by the cam ring (not shown) moves in the optical axis direction to perform an auto-focus operation.

Figure 8:
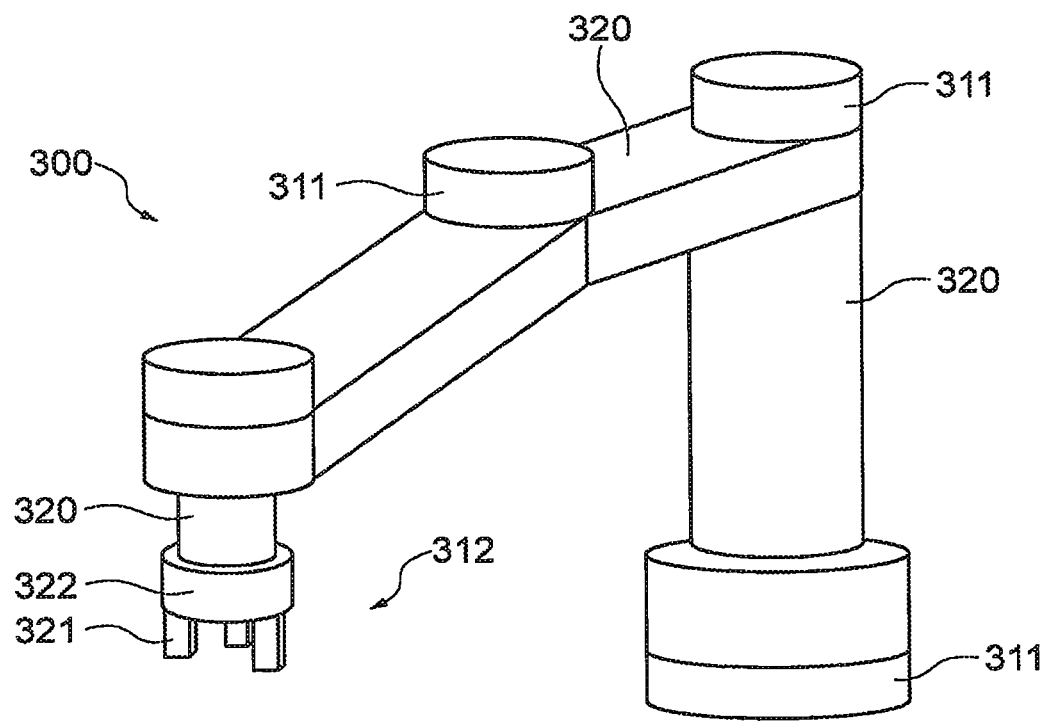
FIG. 8 is a perspective view showing a schematic structure of a robot including the vibration type actuator.

FIG. 8 is a perspective view showing a schematic configuration of a robot 300 in which a vibration type actuator is mounted, and the robot 300 is an example of a horizontal articulated robot which is one of industrial robots. A motor used for a bending motion at an arm joint portion of the robot or a gripping motion at a hand portion is required to have a T-N characteristic (a drooping characteristic showing a relationship between a load torque and a revolution per minute (rpm)) of a high torque at a low rpm. Therefore, it is considered that the vibration type actuator is suitable for the use described above.

The vibration type actuator 1 is embedded in an arm joint portion 311 or a hand portion 312. The arm joint portion 311 connects two arms 320 to each other such that an angle between the two arms can be changed. The hand portion 312 includes the arms 320, a grip portion 321 attached to one end of the arm 320, and a hand joint portion 322 connecting the arm 320 and the grip portion 321 to each other. The vibration type actuator 1 is embedded in the arm joint portion 311 to change an angle between the arms 320 and embedded in the hand joint portion 322 to rotate the grip portion 321 by a predetermined angle.

Although the present invention has been described in detail based on preferred embodiment hereinabove, the present invention is not limited to a certain embodiment, and various embodiments which do not depart from the gist of the present invention are also included in the present invention. For example, the vibration type actuator 1 which is rotationally driven and includes the ring-shaped contact body 6 has been described in the above embodiment. However, the sintered stainless steel body including the resin impregnating portion described above can also be applied to a contact body of a vibration type actuator which is linearly driven. In addition, although the configuration in which the sintered stainless steel body is impregnated with the epoxy resin has been described in the above embodiment, the present invention is not limited thereto and a sintered stainless steel body in which a frictional sliding face of a protrusion of a vibrating body is impregnated with a resin containing a fluorescent material may also be used. In other words, a sintered body in which at least one of a frictional sliding face of a vibrating body and a frictional sliding face of a contact body is impregnated with a resin containing a fluorescent material may be used.

Although the epoxy resin has been described as a resin impregnating the sintered stainless steel body in the embodiment above, the present invention is not limited thereto and the sintered stainless steel body may be impregnated with another resin containing a fluorescent material. In addition, the sintered stainless steel body is impregnated with the resin in the above embodiment, but a stainless steel ingot material in which a hole is provided by laser or the like may be filled with a resin. As the resin impregnating the sintered body, a mixture of ceramic powder such as GC having a size of #1000 to #8000 may be used, which makes it possible to improve wear resistance of the frictional sliding face.

In the above description, although the image pickup apparatus and the industrial robot have been described as examples of the electronic device using the vibration type actuator 1, the present invention is not limited thereto and various devices including components driven by the vibration type actuator 1 can be used.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-076278, filed Apr. 11, 2018 which is hereby incorporated by reference herein in its entirety.

What is claimed is:

1. A vibration type actuator comprising:
a vibrating body including an electro-mechanical energy conversion element and an elastic body; and
a contact body configured to come into contact with the vibrating body,
wherein the vibration type actuator has a structure in which at least one of a friction portion of the contact body coming into contact with the vibrating body and a friction portion of the vibrating body coming into contact with the contact body has a metallic portion including a pore that is impregnated with a resin containing a fluorescent material.

2. The vibration type actuator according to claim 1, wherein the metallic portion is a sintered stainless steel body of which a surface porosity of the friction portion is 5 to 20%.

3. The vibration type actuator according to claim 2, wherein the sintered stainless steel body is made of a martensitic stainless steel.

4. The vibration type actuator according to claim 1, wherein one of the at least one of the friction portion of the contact body and the at least one of the friction portion of the vibrating body has an inclined face inclined on a side of an outer circumference of the contact body at a predetermined angle with respect to a frictional sliding face thereof with the other of friction portions, and the inclined face has a pore at a surface thereof.

5. The vibration type actuator according to claim 1, wherein the resin contains ceramic powder.

6. The vibration type actuator according to claim 1, wherein the fluorescent material is a fluorescent dye or a fluorescent pigment.

7. An electronic device having a vibration type actuator, and a component driven by the vibration type actuator,
the vibrating type actuator comprising:
a vibrating body including an electro-mechanical energy conversion element and an elastic body; and
a contact body configured to come into contact with the vibrating body,
wherein the vibration type actuator has a structure in which at least one of a friction portion of the contact body coming into contact with the vibrating body and a friction portion of the vibrating body coming into contact with the contact body has a metallic portion including a pore that is impregnated with a resin containing a fluorescent material.

8. A method for inspecting a friction material in which a metallic sintered body is impregnated with a resin containing a florescent material, in a vibration type actuator including a vibrating body and a contact body, the metallic sintered body being used for at least one of a friction portion of the contact body coming into contact with the vibrating body and a friction portion of the vibrating body coming into contact with the contact body,
wherein a depth or a rate of impregnation of the friction material with the resin is measured by observing the friction material by a fluorescence microscope.

9. The method for inspecting the friction material according to claim 8, wherein the depth of impregnation with the resin is measured by observing a face forming a predetermined angle with a frictional sliding face of the friction material, or a surface of the sintered body corresponding to a portion from one end of the face to an outer circumference of the sintered body from the outside by the fluorescence microscope.

* * * * *